No. 878,951. PATENTED FEB. 11, 1908.
M. HENDRICKS.
CAR WHEEL.
APPLICATION FILED OCT. 5, 1906.
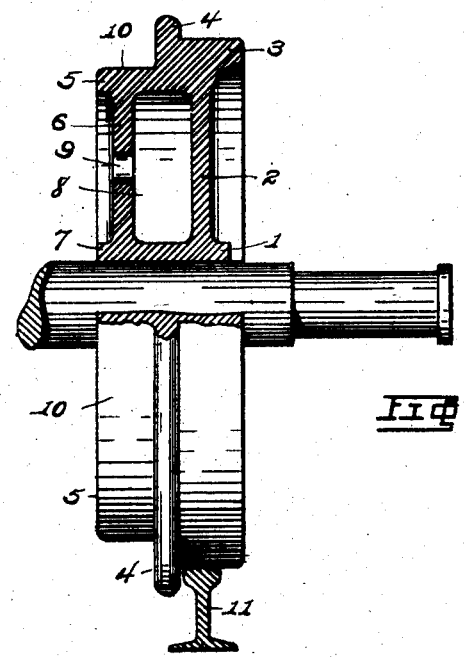
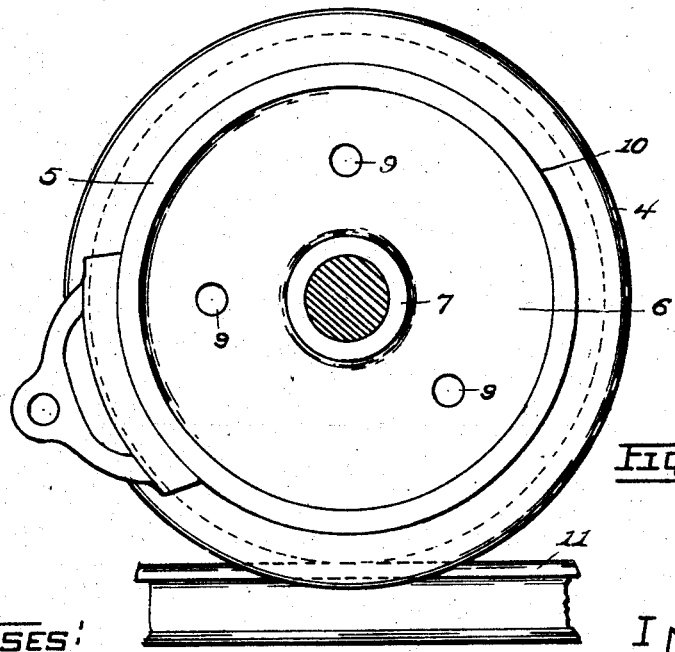
WITNESSES:
Robt F. Dilworth
E. A. Lenhard
INVENTOR
Murray Hendricks.
By A. E. Sundalf
ATTORNEY

UNITED STATES PATENT OFFICE.

MURRAY HENDRICKS, OF BENWOOD, WEST VIRGINIA.

CAR-WHEEL.

No. 878,951.  Specification of Letters Patent.  Patented Feb. 11, 1908.

Application filed October 5, 1906. Serial No. 337,508.

*To all whom it may concern:*

Be it known that I, MURRAY HENDRICKS, a citizen of the United States of America, and resident of Benwood, county of Marshall, and State of West Virginia, have invented certain new and useful Improvements in Car-Wheels, of which the following is a specification.

My invention relates to new and useful improvements in car wheels, and it has for its object to provide a car wheel having a braking surface remote from the tread portion of the wheel and from the lubricating box carried by the car axle.

As is well known, it frequently happens that oil from the lubricating boxes, located on the car axles on the outer sides of the car wheels, drips upon the sides of the wheels and runs down upon the tread portions thereof. In such cases the brakes have little effect when applied owing to the fact that the brake-shoes slide more or less freely over the oiled tread. Accidents frequently result when the tread portions of the wheels have been thus lubricated from the fact that the ordinary braking power applied fails to produce the desired or expected checking of the train's momentum.

The object of this invention is to provide a car wheel by means of which the difficulties before mentioned are obviated, said wheel being provided with an extension on its inner side with a braking surface to which the brake-shoe is applied and to which oil from said lubricating box cannot drain.

In describing the invention in detail, reference is herein had to the accompanying drawings, forming a part of this specification, in which—

Figure 1 is an edge view, partly in section, of my improved car wheel, and Fig. 2 is a side elevation of the same.

Referring to said drawings, in which like reference-numerals designate like parts throughout the several views—1 indicates the hub, 2 the web, 3 the tread portion, and 4 the flange of the car wheel, all said parts being integral. On the inner side of the wheel is an integral annular braking rim 5 of a diameter slightly less than that of the tread portion, said rim 5 being supported or strengthened by a web 6 which connects it to an extension 7 of the hub 1, as shown. A circular hollow core 8 is formed between the webs 2 and 6, and sand-holes 9 are provided in the web 6 to communicate with said core for a purpose well understood by those familiar with metal casting.

The annular face 10 of the rim 5 is adapted to be engaged by the brake-shoe; and, since the flange 4 serves to prevent oil from passing to the rim 5 from the outer side of the wheel, the annular face 10 is at all times in condition for giving full effect to the braking power applied.

In order to guard against the rim 5 engaging switch-rails, which are sometimes elevated above the track rails 11, also to avoid derailing contact with elevations or obstacles on the inner side of the track rails, said rim is made of a slightly less diameter than the tread portion of the wheel, as shown, and at the same time approximates the diameter of said tread portion so closely as to affect but little the braking power of an application of the brakes.

The web 2 stands vertical, as shown, and is so positioned that its central line is substantially coincident with the central line of pressure on the bearing face of the rail, thus giving the maximum amount of strength to said web.

Having thus described my invention, what I claim as new, and desire to secure by Letters Patent, is—

1. A homogeneous car wheel comprising a hub, a tread portion, a web connecting said hub and said tread portion, the median line of said web being substantially coincident with the central line of pressure on the bearing face of the rail, a guard flange, an annular rim on the side of the flange opposite to the tread portion, said rim having an annular face adapted for receiving the pressure of the brake-shoe, and a web connecting said rim and said hub.

2. A homogeneous one-piece hollow car wheel, comprising a hub, a tread portion, a vertical web connecting said hub and said tread portion, the median line of said web being substantially coincident with the central line of pressure on the bearing-face of the rail, a guard flange, an annular rim on the side of the flange opposite to the tread portion, said rim being smaller than, but approximating, the tread portion in diameter; an integral extension carried by said hub, and a second vertical web connecting said rim and said extension, said second web being located centrally with respect to said rim.

In testimony whereof I affix my signature in presence of two subscribing witnesses.

MURRAY HENDRICKS.

Witnesses:
 H. E. DUNLAP,
 ROBT. F. DILWORTH.